(12) United States Patent     (10) Patent No.:   US 12,631,839 B2

Akiyama et al.     (45) Date of Patent:    May 19, 2026

(54) OPTICAL FIBER UNIT AND OPTICAL CABLE

(71) Applicant: SUMITOMO ELECTRIC INDUSTRIES, LTD., Osaka (JP)

(72) Inventors: Takemasa Akiyama, Osaka (JP); Fumiaki Sato, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 314 days.

(21) Appl. No.: 18/429,642

(22) Filed: Feb. 1, 2024

(65) Prior Publication Data

US 2024/0329346 A1    Oct. 3, 2024

(30) Foreign Application Priority Data

Mar. 31, 2023    (JP) .................................. 2023-057812

(51) Int. Cl.
    G02B 6/44        (2006.01)

(52) U.S. Cl.
    CPC .................................... G02B 6/443 (2013.01)

(58) Field of Classification Search
    CPC .............................. G02B 6/4429; G02B 6/443
    USPC ................................................. 385/109–113
    See application file for complete search history.

(56) References Cited

U.S. PATENT DOCUMENTS

| | | | | |
|---|---|---|---|---|
| 6,317,542 | B1 * | 11/2001 | Hardwick, III | ...... G02B 6/4411 |
| | | | | 385/112 |
| 8,031,997 | B2 * | 10/2011 | Overton | ............. G02B 6/02395 |
| | | | | 385/112 |
| 8,463,095 | B2 * | 6/2013 | Bohler | ................. G02B 6/4435 |
| | | | | 385/100 |
| 2012/0213483 | A1 * | 8/2012 | Risch | ................... G02B 6/4431 |
| | | | | 385/113 |
| 2014/0023331 | A1 * | 1/2014 | Lim | ....................... G02B 6/443 |
| | | | | 526/348 |
| 2018/0348464 | A1 | 12/2018 | Sato et al. | |
| 2023/0110693 | A1 | 4/2023 | Sato et al. | |

FOREIGN PATENT DOCUMENTS

| | | | |
|---|---|---|---|
| JP | 2017-134267 A | 8/2017 | |
| WO | WO 01/21706 A1 * | 3/2001 | ............. C08L 23/06 |
| WO | 2021-241485 A1 | 12/2021 | |

\* cited by examiner

*Primary Examiner* — Robert Tavlykaev

(74) *Attorney, Agent, or Firm* — McDonald Hopkins LLC

(57) ABSTRACT

An optical fiber unit includes: a plurality of optical fibers; and a tube covering the plurality of optical fibers. In the optical fiber unit, a tensile elongation rate of the tube is 100% or more and 500% or less. An optical cable includes: a plurality of optical fiber units; and a cable sheath covering the plurality of optical fiber units. In the optical cable, each of the plurality of optical fiber units includes: a plurality of optical fibers; and a tube covering the plurality of optical fibers, and a tensile elongation rate of the tube is 100% or more and 500% or less.

4 Claims, 3 Drawing Sheets

OPTICAL FIBER UNIT AND OPTICAL CABLE

TECHNICAL FIELD

The present disclosure relates to an optical fiber unit and an optical cable. This application is based on and claims priority under 35 USC 119 from Japanese Patent Application No. 2023-057812 filed on Mar. 31, 2023, the contents of which are incorporated herein by reference.

BACKGROUND

JP2017-134267A and WO2021/241485A1 disclose, as an optical fiber cable, a loose-tube-type cable in which a plurality of tube-covered optical fiber units, each of which includes a plurality of optical fibers collected together, are bundled and covered with a cable sheath.

SUMMARY

The present disclosure provides an optical fiber unit including: a plurality of optical fibers; and a tube covering the plurality of optical fibers, in which a tensile elongation rate of the tube is 100% or more and 500% or less.

The present disclosure provides an optical cable including: a plurality of optical fiber units; and a cable sheath covering the plurality of optical fiber units, in which each of the plurality of optical fiber units includes: a plurality of optical fibers; and a tube covering the plurality of optical fibers, and a tensile elongation rate of the tube is 100% or more and 500% or less.

DETAILED DESCRIPTION

Figure 1:
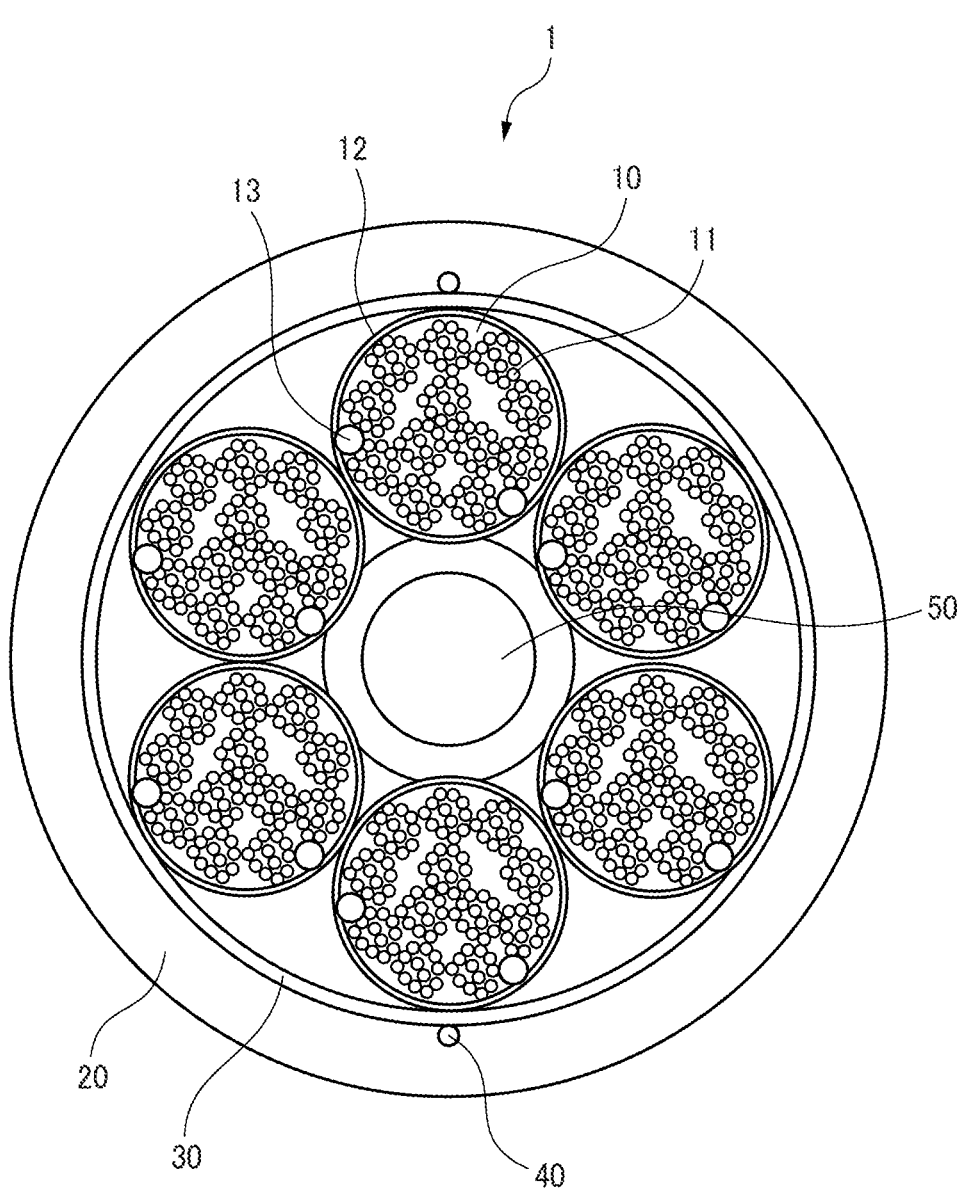
FIG. 1 is a cross-sectional view of an optical cable according to an embodiment of the present disclosure.

In a case of using the loose-tube-type cable, when taking out the tube-covered optical fiber unit, the tube is generally torn by a human hand to expose the optical fibers stored inside the tube. However, there are problems in that the work of tearing the tube may take time, or the optical fibers may be damaged during the work. Accordingly, it is required to improve the efficiency of the work of tearing the tube by hand, that is, a tearability.

An object of the present disclosure is to provide an optical fiber unit and an optical cable in which the workability in taking out optical fibers is good.

According to the present disclosure, it is possible to provide an optical fiber unit and an optical cable in which the workability in taking out optical fibers is good.

Description of Embodiment of Present Disclosure

First, an embodiment of the present disclosure will be listed and described.

(1) An optical fiber unit according to an embodiment of the present disclosure includes a plurality of optical fibers;

and a tube covering the plurality of optical fibers, and a tensile elongation rate of the tube is 100% or more and 500% or less.

In the optical fiber unit of the above (1), since the tensile elongation rate of the tube is 500% or less, the tearability is good, and the workability in taking out the optical fibers is good. Further, since the tensile elongation rate of the tube is 100% or more, the extrudability and an appearance at the time of molding the tube are excellent.

(2) In the optical fiber unit of the above (1), a tensile strength of the tube is 5 MPa or more and 30 MPa or less.

If the tensile strength is less than 5 MPa, there is a risk that the tube may be broken due to tension at the time of laying, and the appearance may be deteriorated. Further, if the tensile strength is more than 30 MPa, the tearability may be deteriorated. In the optical fiber unit of the above (2), since the tensile strength is in an appropriate range, it is easy to control the tensile elongation rate to an appropriate range, and the workability in taking out the optical fibers is particularly excellent.

(3) In the optical fiber unit according to the above (1) or (2), the tube contains: a block copolymer of polybutylene terephthalate and polyether; and silica, and a content of the silica is 1.6 parts by mass or more and 2.6 parts by mass or less with respect to 100 parts by mass of the block copolymer.

In the optical fiber unit of the above (3), the silica for reducing the elasticity of the tube is added, and the tensile elongation rate of the tube can be controlled to an appropriate range. Accordingly, the workability in taking out the optical fibers is particularly excellent.

(4) An optical cable of the present disclosure includes a plurality of optical fiber units, each of which is according to any one of the above (1) to (3); and a cable sheath covering the plurality of optical fiber units.

In the optical cable of the above (4), the tube covering the stored optical fiber units has a good tearability, and the workability in taking out the optical fiber is good.

Details of Embodiment of Present Disclosure

A specific example of an optical fiber unit and an optical cable according to an embodiment of the present disclosure will be described below with reference to the drawings. The present disclosure is not limited to these exemplifications, but is indicated by the scope of claims, and is intended to include all modifications within a scope and meaning equivalent to the scope of claims.

FIG. 1 is a cross-sectional view showing an example of an optical cable 1 according to the present embodiment. The optical cable 1 is a loose-tube-type cable including a plurality of optical fiber units 10 and a cable sheath 20 covering the plurality of optical fiber units 10. Each of the optical fiber units 10 includes a plurality of optical fibers 11 and a tube 12 covering the plurality of optical fibers 11.

The plurality of optical fibers 11 are arranged in parallel and stored inside the tube as an optical fiber ribbon. In the example shown in FIG. 1, twelve optical fibers 11 are arranged in parallel to form an optical fiber ribbon. The optical fiber ribbon is an intermittent ribbon in which the optical fibers 11 are intermittently connected to each other, and in the intermittent ribbon, a connecting portion in which adjacent optical fibers 11 are connected and a non-connecting portion in which adjacent optical fibers 11 are not connected are intermittently provided in a longitudinal direction in a state in which the plurality of optical fibers 11 are arranged in parallel.

Figure 2:
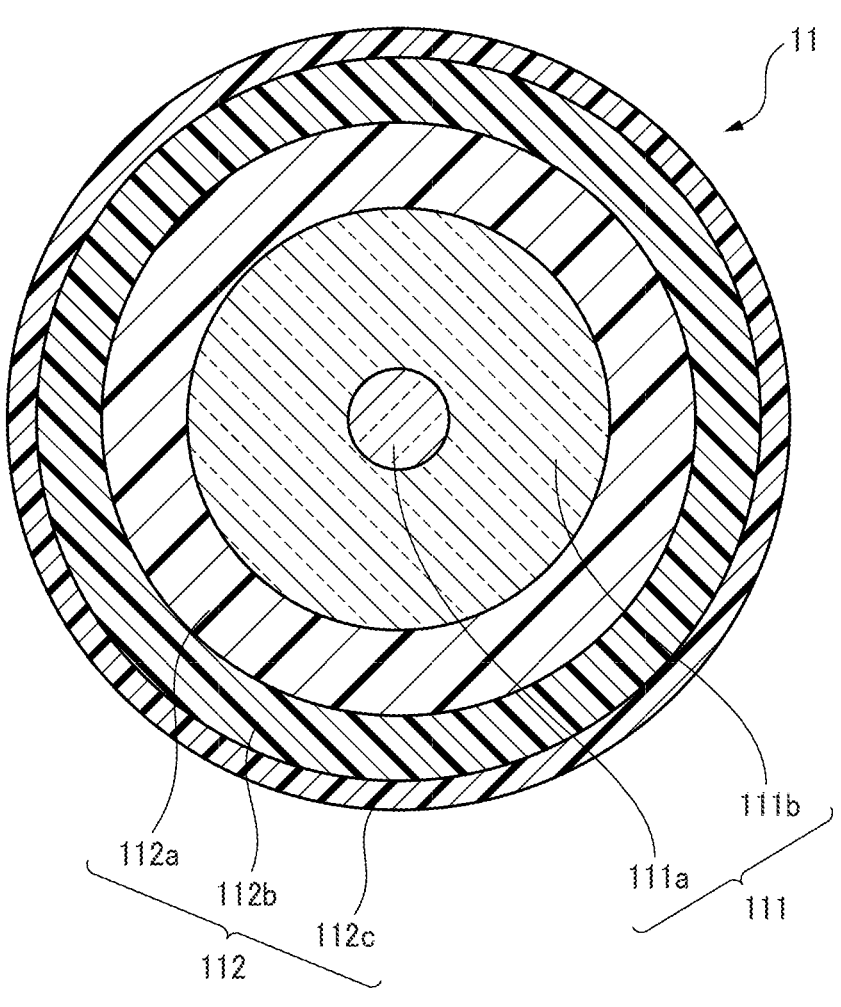
FIG. 2 is a cross-sectional view showing an example of an optical fiber.

FIG. 2 is a cross-sectional view showing an example of the optical fiber 11. As shown in FIG. 2, the optical fiber 11 includes a glass fiber 111 and a resin layer 112 covering the glass fiber 111. The glass fiber 111 includes a core 111a and a cladding 111b having a refractive index lower than that of the core 111a, and the cladding 111b is provided to surround the core 111a. The core 111a and the cladding 111b are made of glass, for example, $SiO_2$ glass. The resin layer 112 includes a primary layer 112a, a secondary layer 112b, and a colored layer 112c. The resin layer 112 can be formed by, for example, curing an ultraviolet curable resin composition containing an oligomer, a monomer, and a photopolymerization initiator.

A diameter of the glass fiber 111 is usually about 125 μm, and a total thickness of the resin layer 112 is, for example, 70 μm or less. A diameter of the optical fiber 11 is, for example, 245 μm or more and 265 μm or less, and is 180 μm or more and 220 μm or less in the case of a thin-diameter optical fiber.

The tube 12 covers the plurality of optical fibers 11. In the example of FIG. 1, a plurality of optical fiber ribbons are stored inside one tube 12. In order to improve the waterproof property, an inside of the tube 12 may be filled with a gel or a water absorption yarn.

A thickness of the tube 12 is about 0.05 mm or more and 0.2 mm or less, depending on a material thereof.

The tube 12 is made of a soft material. The soft material is, for example, a resin material having a Young's modulus of 10 MPa or more and 400 MPa or less. Examples of the material constituting the tube 12 include low-density polyethylene (LDPE), linear low-density polyethylene (LLDPE), and a thermoplastic elastomer.

The thermoplastic elastomer is a material having both properties of a thermoplastic resin and properties of an elastomer. Examples of the thermoplastic elastomer used as the material constituting the tube include a polyester-based thermoplastic elastomer such as a block copolymer of polybutylene terephthalate (PBT) and polyether; and an ethylene-vinyl acetate copolymer (EVA).

The tube 12 may contain an inorganic filler. Examples of the inorganic filler include silica, aluminum hydroxide, calcium carbonate, and magnesium oxide. A manner of adding the inorganic filler is not particularly limited, and the inorganic filler may be added alone, or may be added in a form of pellets in which the inorganic filler is dispersed in an appropriately selected resin material.

When silica is added to the tube 12, a tensile elongation rate of the tube 12 can be reduced. An addition amount of the silica can be appropriately adjusted according to characteristics of the soft material constituting the tube 12, and is typically about 0.1 part by mass or more and 5.0 parts by mass or less, and preferably 1.0 part by mass or more and 3.0 parts by mass or less with respect to 100 parts by mass of the soft material. For example, when the block copolymer of PBT and polyether is used as the soft material of the tube 12, a content of the silica is preferably 1.6 parts by mass or more and 2.6 parts by mass or less with respect to 100 parts by mass of the block copolymer.

When the aluminum hydroxide or the calcium carbonate is added to the tube 12, the flame retardance and the low smoke emission property are improved.

The optical fiber unit 10 may include a tear string 13. The tear string 13 is provided along a longitudinal direction of the optical fiber. By pulling the tear string 13 to tear the tube 12, the optical fibers 11 inside the tube 12 can be taken out. In a cross-sectional view of the optical fiber unit 10, at least a part of the tear string 13 may be buried in the tube 12.

As shown in FIG. 1, the optical cable 1 includes a plurality of optical fiber units 10. FIG. 1 shows an example including six optical fiber units 10, but the number of optical fiber units is not particularly limited. Although the tube 12 has a perfectly circular cross section in FIG. 1, the tube 12 is made of a soft material and thus is easily deformable. Since the tube 12 is easily deformable, a density of the optical fibers 11 stored in the optical cable 1 can be increased.

The optical cable 1 includes the cable sheath 20 covering the plurality of optical fiber units 10. The cable sheath 20 is made of a hard material such as high-density polyethylene. The hard material is, for example, a resin material having a Young's modulus of 800 MPa or more and 1200 MPa or less.

The optical cable 1 may include a water absorbing tape 30 inside the cable sheath 20. By providing the water absorbing tape 30, the waterproof property of the optical cable is improved.

The optical cable 1 may include a tear string 40. By pulling the tear string 40 to tear the cable sheath 20, the optical fiber units 10 stored therein can be taken out.

The optical cable 1 may include a tension member 50. The tension member 50 is made of, for example, fiber-reinforced plastic (FRP) or aramid fibers, and prevents excessive stress from being applied to the optical fibers 11. In the example shown in FIG. 1, one tension member 50 is disposed at a center of the optical cable in a cross-sectional view, but a position of the tension member 50 is not limited thereto, and two or more tension members 50 may be provided.

In the optical fiber unit 10, the tensile elongation rate of the tube 12 is 100% or more and 500% or less. Since the tensile elongation rate of the tube 12 is 500% or less, the tearability is good, and the efficiency of the work of taking out the optical fibers 11 is improved. Further, since the tensile elongation rate of the tube 12 is 100% or more, the tube 12 is excellent in extrudability during molding. The tensile elongation rate of the tube 12 can be adjusted depending on, for example, a type of material of the tube 12, a type of the fillers to be added, and an addition amount of the fillers. The tensile elongation rate of the tube 12 is preferably 150% or more and 450% or less, and more preferably 200% or more and 400% or less.

The tensile elongation rate in the present specification is synonymous with an elongation rate at break, and refers to an elongation rate at break in a tensile test. The tensile elongation rate can be measured, for example, by a method to be described in Examples.

The tube 12 of the optical fiber unit 10 may have a tensile strength of 5 MPa or more and 30 MPa or less. If the tensile strength is in this range, the tensile elongation rate can be easily controlled to an appropriate range. The tensile strength of the tube 12 is more preferably 10 MPa or more and 25 MPa or less.

The tensile strength in the present specification is a maximum stress applied until a sample is broken in a tensile test. Specifically, the tensile strength is a value (unit: MPa) obtained by dividing the maximum test force applied to the sample until breakage in the tensile test by a cross-sectional area of the sample.

EXAMPLES (Preparation of Tube)

Regarding Examples 1 to 18, each of materials containing compositions shown in Tables 1 and 2 was put into an extrusion molding machine (manufactured by Research Laboratory of Plastics Technology Co., Ltd, model: q30 horizontal type), and passed through a die to mold a tube having an outer diameter of 5 mm and a thickness of 0.15 mm. A temperature during molding was appropriately adjusted in a range of 150° C. to 200° C. depending on the material to be used.

Details of each material shown in Tables 1 and 2 are as follows.

Low-density polyethylene A: obtained by adding a mixture of LLDPE and EVA into aluminum hydroxide (for example, EC-8500 manufactured by Avient Corporation)

Low-density polyethylene B: LLDPE (for example, DFDJ7540 manufactured by ENEOS NUC Corporation)

Copolymer of low-density Polyethylene B: a copolymer of 78 mass % of LLDPE, 12 mass % of olefin resin, and 10 mass % of HDPE resin Thermoplastic elastomer A: a propylene/α-olefin copolymer (for example, TAFMER (registered trademark) PN-3560 manufactured by Mitsui Chemicals, Inc.)

Thermoplastic elastomer B: a cyclic olefin copolymer (for example, APL6011T manufactured by Mitsui Chemicals, Inc.)

Thermoplastic elastomer C: a block copolymer of PBT and polyether (for example, HYTREL (registered trademark) 4767N manufactured by Toray Industries, Inc.)

Thermoplastic elastomer D: a block copolymer of PBT and polyether (for example, HYTREL 3046 manufactured by Toray Industries, Inc.)

Thermoplastic elastomer E: a block copolymer of PBT and polyether (for example, HYTREL G3548LN manufactured by Toray Industries, Inc.)

Silica: silica was added in a form of pellets in which silica was kneaded into LLDPE. A content of the silica in the pellets is 10%. For example, "1 part by mass of the silica" indicates that 10 parts by mass of the pellets were added.

Silicone: silicone was added in a form of pellets in which the silicone was kneaded into LDPE. A content of the silicone in the pellets is 50%. For example, "5 parts by mass of the silicone" indicates that 10 parts by mass of the pellets was added.

Polypropylene: polypropylene was added in a form of pellets.

Calcium carbonate: calcium carbonate was added in a form of powder.

(Evaluation)

Each of the prepared tubes was evaluated for tensile elongation rate, tensile strength, extrudability, tearability, and appearance by the following methods.

6

<Tensile Elongation Rate and Tensile Strength>

A tube sample having an inner diameter of 3.85 mm and a wall thickness of 0.15 mm was cut out from each of the tubes. Using a tensile tester (manufactured by Shimadzu Corporation, model number: AG-XPlus), the cut-out sample was pulled at a rate of 500 mm/min, and an elongation rate and a stress until the sample was broken were measured. The elongation rate (%) and the maximum stress (MPa) of the sample immediately before break were defined as the tensile elongation rate and the tensile strength, respectively. A formula for calculating the tensile elongation rate is as follows.

$$\text{Tensile elongation rate (\%)} = \{(\text{distance between standard points immediately before break}) - (\text{distance between standard points before test})\} / (\text{distance between standard points before test}) \times 100$$

Figure 3:
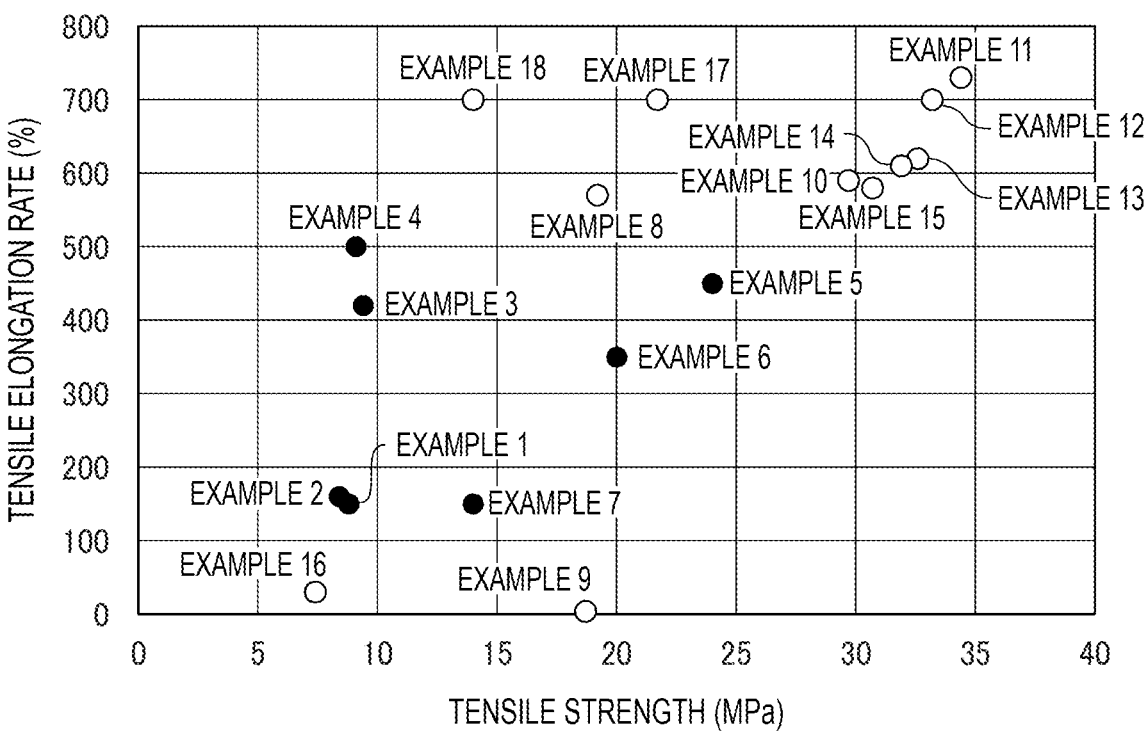
FIG. 3 is a graph showing tensile strengths and tensile elongation rates of tubes according to Examples and Comparative Examples.

Measurement results of the tensile elongation rate and the tensile strength are shown in Tables 1 and 2. FIG. 3 is a graph plotting the measurement results of the respective tubes with a horizontal axis representing the tensile strength and a vertical axis representing the tensile elongation rate. In FIG. 3, a black circle represents an example in which all the evaluations for the extrudability, the tearability, and the appearance to be described later are A or B, and a white circle represents an example in which at least one of the extrudability, the tearability, and the appearance is C.

<Extrudability>

At the time of extrusion-molding the tube, A was set for a tube which can be satisfactorily molded without coating cracks, C was set for a tube which has coating cracks and molding defects, and B was set for a tube which has an intermediate property. The evaluation results for extrudability are shown in Table 1.

<Tearability>

A skilled worker tore the tube by hand to evaluate the tearability of the tube. A sample in which an excessive force for tearing is not required and the tearability is particularly good was evaluated as A, a sample in which the tearability is good and is at an allowable level was evaluated as B, and a sample in which an excessive force is required for tearing and the tearability is poor was evaluated as C. The evaluation results for the tearability are shown in Tables 1 and 2.

<Appearance>

The tube was touched by hand to evaluate a state of a tube surface. A was set for a sample having a smooth surface, C was set for a sample having a rough surface, and B was set for a sample having an intermediate surface.

(Table 1)

TABLE 1

| | | Example 1 | Example 2 | Example 3 | Example 4 | Example 5 | Example 6 | Example 7 | Example 8 | Example 9 |
|---|---|---|---|---|---|---|---|---|---|---|
| Composition (part by mass) | Low-density polyethylene A | 100 | 90 | 90 | 75 | | | | 75 | 75 |
| | Low-density polyethylene B | | | | | | | | | |
| | Copolymer of low-density polyethylene B | | | | | | | | | |
| | Thermoplastic elastomer A | | | | 25 | | | | | |
| | Thermoplastic elastomer B | | | | | | | | | 25 |
| | Thermoplastic elastomer C | | | | | 100 | 100 | 100 | | |
| | Thermoplastic elastomer D | | | | | | | | | |
| | Thermoplastic elastomer E | | | | | | | | | |
| | Silica | | 1 | | | 1.6 | 2 | 2.6 | | |
| | Silicone | | | 5 | | | | | | |
| | Polypropylene | | | | | | | | 25 | |
| | Calcium carbonate | | | | | | | | | |

TABLE 1-continued

| | | Example 1 | Example 2 | Example 3 | Example 4 | Example 5 | Example 6 | Example 7 | Example 8 | Example 9 |
|---|---|---|---|---|---|---|---|---|---|---|
| Evaluation | Tensile elongation rate (%) | 150 | 160 | 420 | 500 | 450 | 350 | 150 | 570 | 4 |
| | Tensile strength (MPa) | 8.8 | 8.4 | 9.4 | 9.1 | 24 | 20 | 14 | 19.2 | 18.7 |
| | Extrudability | A | A | A | A | A | A | A | A | C |
| | Tearability | A | A | A | B | A | A | A | C | A |
| | Appearance | A | A | Å | B | A | A | A | A | A |

(Table 2)

TABLE 2

| | | Example 10 | Example 11 | Example 12 | Example 13 | Example 14 |
|---|---|---|---|---|---|---|
| Composition (part by mass) | Low-density polyethylene A | | | | | |
| | Low-density polyethylene B | 100 | | | | |
| | Copolymer of low-density polyethylene B | | 100 | | | |
| | Thermoplastic elastomer A | | | | | |
| | Thermoplastic elastomer 8 | | | | | |
| | Thermoplastic elastomer C | | | 100 | 100 | 100 |
| | Thermoplastic elastomer D | | | | | |
| | Thermoplastic elastomer E | | | | | |
| | Silica | | | | | |
| | Silicone | | | | | |
| | Polypropylene | | | | | |
| | Calcium carbonate | | | | 10 | 30 |
| Evaluation | Tensile elongation rate (%) | 590 | 730 | 700 | 620 | 610 |
| | Tensile strength (MPa) | 29.7 | 34.4 | 33.2 | 32.6 | 31.9 |
| | Extrudability | A | A | A | A | A |
| | Tearability | C | C | C | C | C |
| | Appearance | A | A | A | A | A |

| | | Example 15 | Example 16 | Example 17 | Example 18 |
|---|---|---|---|---|---|
| Composition (part by mass) | Low-density polyethylene A | | | | |
| | Low-density polyethylene B | | | | |
| | Copolymer of low-density polyethylene B | | | | |
| | Thermoplastic elastomer A | | | | |
| | Thermoplastic elastomer 8 | | | | |
| | Thermoplastic elastomer C | 100 | 100 | | |
| | Thermoplastic elastomer D | | | 100 | |
| | Thermoplastic elastomer E | | | | 100 |
| | Silica | | 3 | | |
| | Silicone | | | | |
| | Polypropylene | | | | |
| | Calcium carbonate | | | | |
| Evaluation | Tensile elongation rate (%) | 580 | 30 | 700 | 700 |
| | Tensile strength (MPa) | 30.7 | 7.4 | 21.7 | 14 |
| | Extrudability | A | C | A | A |
| | Tearability | C | A | C | C |
| | Appearance | A | A | A | C |

Examples 1 to 7 are Examples, and Examples 8 to 18 are Comparative Examples. As shown in Table 1, the tubes each having a tensile elongation rate in the range of 100% or more and 500% or less have excellent extrudability and a good tearability. In particular, when the silica was added in an amount of 1.6 parts by mass or more and 2.6 parts by mass or less with respect to 100 parts by mass of the block copolymer (thermoplastic elastomer C) (Examples 5 to 7), the tensile elongation rate can be controlled in a favorable range of 100% or more and 500% or less. Further, if the tensile strength is 5 MPa or more and 30 MPa or less, breaking due to tension at the time of laying does not occur, and the tearability and the appearance are good.

What is claimed is:

1. An optical fiber unit comprising:

a plurality of optical fibers; and a tube covering the plurality of optical fibers, wherein a tensile elongation rate of the tube is 150% or more and 450% or less to optimize both tearability and extrudability of the tube.

2. The optical fiber unit according to claim 1, wherein a tensile strength of the tube is 5 MPa or more and 30 MPa or less.

3. The optical fiber unit according to claim 1, wherein the tube contains:

a block copolymer of polybutylene terephthalate and polyether; and silica, and wherein a content of the silica is 1.6 parts by mass or more and 2.6 parts by mass or less with respect to 100 parts by mass of the block copolymer.

4. An optical cable comprising:

a plurality of optical fiber units; and a cable sheath covering the plurality of optical fiber units, wherein each of the plurality of optical fiber units comprises:

a plurality of optical fibers; and a tube covering the plurality of optical fibers, and wherein a tensile elongation rate of the tube is 150% or more and 450% or less to optimize both tearability and extrudability of the tube.

* * * * *